(12) United States Patent
Buellesfeld et al.

(10) Patent No.: US 10,870,599 B2
(45) Date of Patent: Dec. 22, 2020

(54) METHOD AND APPARATUS FOR THICKNESS CONTROL OF A MATERIAL RIBBON

(71) Applicant: Schott AG, Mainz (DE)

(72) Inventors: Frank Buellesfeld, Kriftel (DE); Doris Moseler, Budenheim (DE)

(73) Assignee: Schott AG, Mainz (DE)

( * ) Notice: Subject to any disclaimer, the term of this patent is extended or adjusted under 35 U.S.C. 154(b) by 206 days.

(21) Appl. No.: 15/986,175

(22) Filed: May 22, 2018

(65) Prior Publication Data

US 2018/0334405 A1   Nov. 22, 2018

(30) Foreign Application Priority Data

May 22, 2017   (DE) .......................... 10 2017 111 142

(51) Int. Cl.
*C03B 17/06* (2006.01)
*C03B 23/037* (2006.01)
*G05B 1/00* (2006.01)
*C03B 15/02* (2006.01)
*C03B 18/10* (2006.01)
*C03B 18/04* (2006.01)

(52) U.S. Cl.
CPC .......... *C03B 17/067* (2013.01); *C03B 15/02* (2013.01); *C03B 17/064* (2013.01); *C03B 18/04* (2013.01); *C03B 18/10* (2013.01); *C03B 23/037* (2013.01); *G05B 1/00* (2013.01)

(58) Field of Classification Search
CPC ........................... C03B 17/061; C03B 17/068
See application file for complete search history.

(56) References Cited

U.S. PATENT DOCUMENTS

| | | | | |
|---|---|---|---|---|
| 4,785,186 A | * | 11/1988 | Street | ........................ G01T 1/24 250/370.01 |
| 7,735,338 B2 | | 6/2010 | Mueller et al. | |
| 8,904,822 B2 | | 12/2014 | LeBlanc et al. | |
| 9,290,403 B2 | | 3/2016 | Anderson et al. | |
| 2009/0217705 A1 | | 9/2009 | Filippov et al. | |
| 2009/0299353 A1 | * | 12/2009 | Lewinsky | ............ A61B 17/295 606/16 |

(Continued)

FOREIGN PATENT DOCUMENTS

| | | |
|---|---|---|
| DE | 101 28 636 C1 | 8/2002 |
| DE | 10 2008 063 554 A1 | 6/2010 |

(Continued)

*Primary Examiner* — Lisa L Herring
(74) *Attorney, Agent, or Firm* — Taylor IP, P.C.

(57) ABSTRACT

A flexible method of controlling the thickness of a material ribbon, in particular a glass ribbon, as well as an apparatus to implement such a method. To this end, a material in a heated and softened state is drawn into a ribbon and is then cooled down. During the forming process during which the ribbon is formed and drawn, the material is heated. During the forming process thermal energy at least partially in the form of thermal radiation that is emitted from a surface of a heated heating element. that is located opposite the material, is supplied to the material. Heating of heating element occurs at least partially through the energy of a laser beam that is directed onto heating element, thereby locally heating the heating element.

18 Claims, 7 Drawing Sheets

(56) References Cited

U.S. PATENT DOCUMENTS

| | | | | |
|---|---|---|---|---|
| 2016/0076115 A1* | 3/2016 | Zeng | ............... | C21D 1/70 |
| | | | | 148/565 |
| 2017/0057874 A1* | 3/2017 | Miao | ............... | C03B 17/067 |
| 2018/0079675 A1* | 3/2018 | Afzal | ............... | C03B 17/064 |
| 2018/0327296 A1* | 11/2018 | Cimo | ............... | B32B 17/06 |

FOREIGN PATENT DOCUMENTS

| | | |
|---|---|---|
| WO | 2011/066064 A2 | 6/2011 |
| WO | 2014/098209 A1 | 6/2014 |
| WO | 2015/080897 A1 | 6/2015 |
| WO | 2016/085778 A1 | 6/2016 |

\* cited by examiner

METHOD AND APPARATUS FOR THICKNESS CONTROL OF A MATERIAL RIBBON

BACKGROUND OF THE INVENTION

1. Field of the Invention

The present invention relates generally to a method and apparatus for controlling the thickness of a material ribbon, for example, a substrate consisting of glass or plastic.

2. Description of the Related Art

Methods for the production of substrates, for example glass or plastic substrates have been known for a long time. However, especially in the manufacture of a glass or plastic ribbon fluctuations and total thickness variation (TTV) occur frequently across the transverse coordinates of the ribbon. These inhomogeneous thickness distributions and the high so-called TTV are the result of varying temperatures that occur across the width of the ribbon during the manufacturing process. A number of different solutions are suggested to counteract the high TTV.

DE 101 28 636 C1 for example, discloses a method wherein the thickness of a flat glass is selectively influenced, and an apparatus to implement such method. Immediately after forming, the flat glass in this case is guided over a device that extends over the entire width of the glass ribbon where a controlled cooling of the glass occurs and where the glass moreover can be subjected across its entire width to targeted and adjustable heating, wherein the heat supply occurs locally by means of a laser beam. This laser beam is guided at a high frequency across the width of the glass ribbon and its output is specifically adjusted so that a spatial resolution and appropriate heat output is achieved. In this manner a flat glass is obtained that has an as consistent a thickness across its width as possible.

Furthermore, DE 10 2008 063 554 A1 describes a method and an apparatus for the manufacture of flat glass wherein the thickness of the glass can also be selectively influenced across the width of the glass. In this case, a glass ribbon is drawn through a slot nozzle and is subsequently directed into a draw station that is configured such that a wall—at least partially across the width of the glass ribbon—features a locally varying radiation absorption and/or thermal conductivity. Moreover, a laser beam can influence the glass ribbon locally to assist in controlling the thickness. In addition, a gas stream can also precisely influence the thickness of the ribbon locally. In this way a glass ribbon is obtained for which a desired thickness profile across its width can be adjusted—for example with greater thickness of the glass in the center of the ribbon as opposed to the edges.

U.S. Pat. No. 8,904,822 B2 discloses a method wherein a glass or plastic substrate with a controlled thickness is produced. In this method, a glass or plastic ribbon is drawn whereby a draw over the edges of the ribbon is implemented. Moreover, the thickness of the ribbon is specified and controlled. If a deviation in the thickness is detected, the region of this thickness deviation is selected, whereby this region is in a viscous condition. The selected region that is in a viscous state is subsequently heated in that a laser beam is directed onto said region. As a result of heating, said region assumes the specified thickness. The heating process comprises control of the laser output, the dwell time of the laser on the selected region and/or adaptation of the wavelength of the laser.

An apparatus for the manufacture of glass and a method for the manufacture of a glass ribbon are known from WO 2015/080897 A1. The apparatus includes a heating module to heat a surface by means of thermal radiation. For this purpose, heating elements are provided in the embodiment of finely segmented heating coils, so that homogeneous and if possible 100% heat coverage of the glass ribbon is achieved. This is a delicate assembly that is highly susceptible to failure.

U.S. Pat. No. 9,290,403 B2 describes heating assemblies for use in glass production. In this case, the distance between the heating element and the glass sheet is adjustable in such a manner that the desired temperature of the glass ribbon or respectively the glass surface is achieved.

WO 2014/098209 A1 describes the optimization of temperature distribution in the production of a glass ribbon. The transverse temperature distribution occurs herein by means of an offset arrangement of heating elements of two heaters which are arranged on the two opposite surfaces of the glass ribbon.

WO 2011/066064 A2 describes a thickness control of a glass ribbon by means of a heat sink-/heater combination.

The aforementioned methods and devices however, have a number of disadvantages. If, for example a gas stream acts upon the ribbon for thickness control via nozzles this could cause waviness across the net width of the ribbon. This is a result of the width of the nozzle and the distance between the glass and the area that is cooled by nozzle. The resolution of such nozzles is approximately 30 mm, so that a fine waviness in the ribbon with an intermittency or wavelength of less than 30 mm cannot be eliminated. The net width herein is the region of the glass ribbon where the properties of the glass ribbon are within the predefined specifications. The net width of a glass ribbon is thus the width of the quality region of the glass ribbon and results generally from the drawn glass ribbon, assuming removal of the edges.

Furthermore, measures to influence the thickness of a glass or plastic ribbon are effective in a region where the glass is in a viscous state. As is stated, for example, in U.S. Pat. No. 8,904,822 B2, this viscous state is defined in a region where the viscosity is greater than $10^5$ dPas. In order to ensure heating of the material that is sufficient to render the material of the ribbon sufficiently flowable to achieve a reduction in thickness, very high outputs have to be applied. This not only renders the method cost intensive, but another significant factor is that due to the high energy or rather outputs of the laser beams the thickness control cannot be implemented sufficiently precisely so that certain fluctuations in thickness across the net width of the glass or plastic ribbon still exist.

In the case of very subtly adjustable positioning or very delicate assemblies, as described for example in WO 2015/080879 A1 or U.S. Pat. No. 9,290,403 B2, these assemblies can be highly susceptible to failure.

In the case of the heating arrangement according to WO 2014/098209 A1 locally effective temperature correction cannot be randomly be adjusted.

With a thickness control as is suggested in WO 2011/066064 A2 a high control complexity results due to the combination of heat sink and heater. Here too, locally effective temperature corrections are barely adjustable.

What is needed in the art is a method for controlled adjustment of the thickness of a glass or plastic ribbon that reduces the existing weaknesses in the current state of the art.

SUMMARY OF THE INVENTION

The present invention provides a flexible method of controlling the thickness of a material ribbon, in particular a glass ribbon, as well as an apparatus to implement such a method.

Accordingly, the present invention provides a method for the manufacture of a material ribbon, wherein a material in a heated and softened state is drawn into a ribbon and is subsequently cooled; wherein during the forming process during which the ribbon is formed and drawn the material is heated; wherein during the forming process thermal energy at least partially in the form of thermal radiation that is emitted from the surface of a heated heating element that is located opposite the material is supplied to the material; wherein heating of the heating element occurs at least partially through the energy of a laser beam that is directed onto the heating element, thereby heating said heating element locally. In the sense of the current invention, the term "heated and softened" is understood to be material conditions of low viscosity, especially also melting of the material.

In contrast to DE 101 28 636 C1, the material is not heated directly with the laser, but rather an indirect heating occurs whereby a heating element is heated which in turn emits thermal radiation which is absorbed by the material of the material ribbon, thus heating same. This offers the advantage that the heating element has a certain thermal capacity and can emit the introduced energy uniformly to the material of the material ribbon. In contrast, a laser beam that is directed directly onto the material ribbon can only heat the material at the moment and location of impingement of the light. If the laser beam is directed over the surface in order to heat a larger area, heating occurs essentially along the path from the point of impingement of the beam and is therefore somewhat inhomogeneous. These inhomogeneities can subsequently manifest themselves in thickness fluctuations in the material ribbon after drawing. An additional point is that, because of a laser beam being locally directly targeted onto the glass, changes could occur in the structure or the composition.

To implement the method, the invention further provides an apparatus to manufacture a material ribbon, including
  a draw device to draw a material in a heated and softened state into a ribbon, and
  a heating element to heat the material during the forming process in which the ribbon is formed and drawn; wherein the heating element is designed to heat by means of thermal radiation that is emitted from the surface of the heating element that is located opposite the heated material or respectively the material that is to be heated; and wherein the apparatus includes a laser that is arranged such that the laser beam of the laser is directed onto the heating element, thus heating the heating element locally.

Typically, the heating element also causes heating of the material. It is also conceivable that overall, heat is removed from the material ribbon at the heating element so that the material ribbon cools down. The heat loss can also be specifically inhibited and thus also controlled with the heating element. Local heating of the heating element with the laser beam does not have to result in a local heating of the material ribbon but rather, can also locally inhibit its cooling down. One embodiment where in spite of the heating element net heat dissipation from the material ribbon and thus a cool-down occurs is an annealing oven. Such an oven is used especially in glass production, to transfer the glass under controlled conditions from molten state to temperatures below the annealing points.

The present invention can basically be used in all processes where direct radiation of the material that is to be processed by means of a laser is disadvantageous or is out of the question, or in order to improve the thickness homogeneity with respect to direct radiation. The method is associated with the production of glass ribbons however, it can also be used in the plastics, metal and semiconductor industries. With regard to glass as the material, all hot forming processes can be considered for forming of glass ribbons wherein the glass is drawn.

The temperature of the material ribbon can be controlled on both sides with heating elements. Accordingly, heating elements are arranged on both sides of the material ribbon which are heated by means of a laser beam. On very thin glass ribbons for example, having a thickness of approximately less than 300 μm one-sided heating may however be sufficient.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
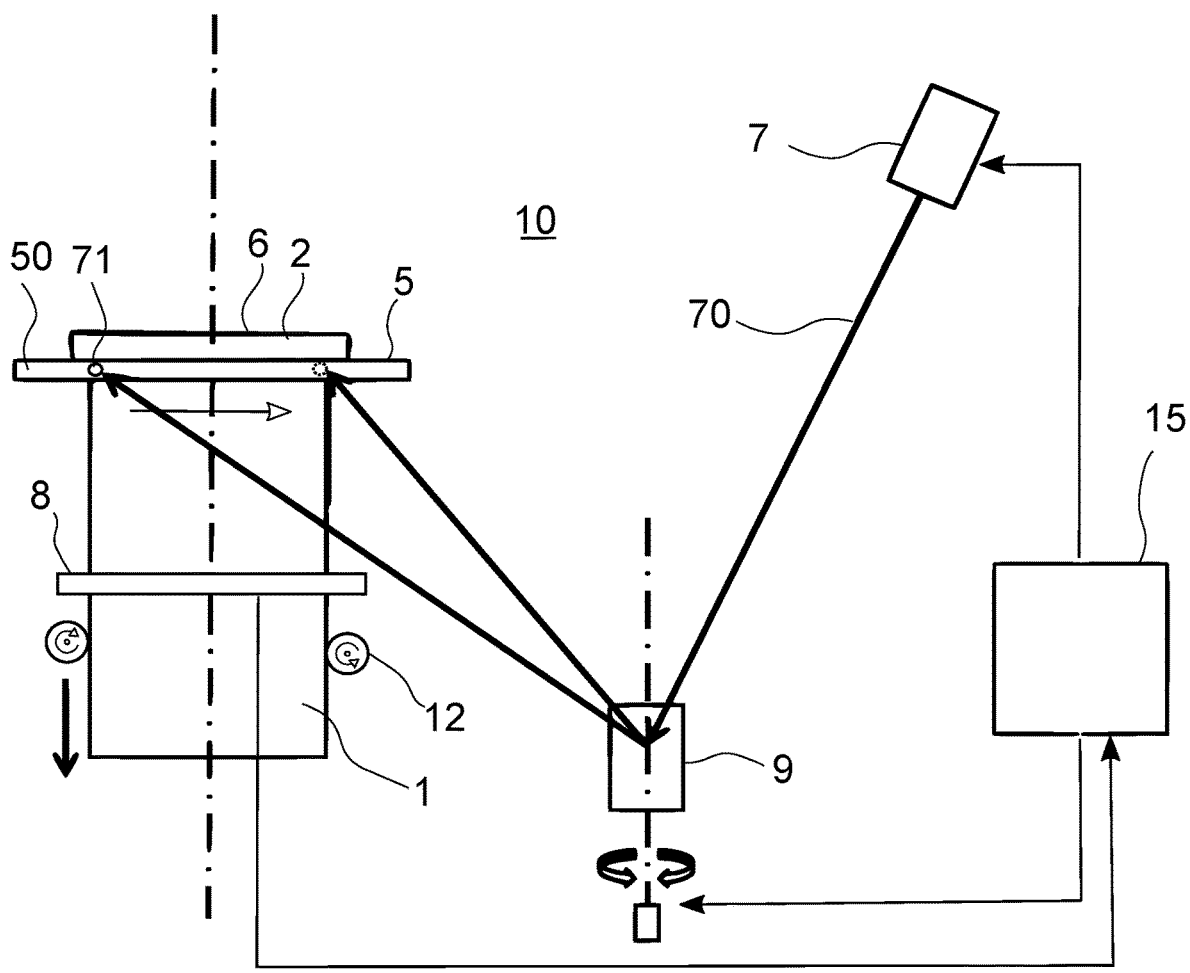
FIG. 1 is a schematic view of a first embodiment of the invention.

Referring now to the drawings, and more particularly to FIG. 1, there is shown an apparatus 10 which serves in the manufacture of a material ribbon 1 with the method according to the present invention. The apparatus 10 includes a draw-device 12 to draw a material 2 in a heated and softened state into a ribbon, and a heating element 5 in order to heat material 2 during the forming process in which the material ribbon is formed and drawn. Heating element 5, heats material 2 by means of thermal radiation. For this purpose, surface 50 of heating element 5 is located at a distance from material 2, so that the thermal radiation is emitted from surface 50 or heating element 5 that is located opposite the heated material and is again absorbed by material 2. Due to inhomogeneous heating or also due to inhomogeneous temperature radiation from material ribbon 1, different temperatures across the lateral coordinate of the ribbon can occur during its forming. This then leads to inhomogeneous thickness distributions and a higher TTV (TTV=total thickness variation). The temperature distribution of the heating element is corrected with the assistance of a laser in such a way that a low TTV results. The laser beam provides additional heat to certain positions of the heating element.

According to the present invention, a laser 7 is thus provided, in order to provide at least part of the heating output of heating element 5. Laser 7 is arranged such that its laser beam 70 is directed onto heating element 5, so that heating element 5 heats up locally due to the absorption of the laser radiation.

Laser sources that are considered can be glass lasers, especially a $CO_2$-laser and solid-state lasers and diode lasers.

To achieve a desired local effect of heating with the laser—without limitation to the illustrated examples—the distance of the surface of the heating element facing the material ribbon can be smaller in the direction transversely to material ribbon 1 than its dimension perpendicular to the longitudinal direction of the material ribbon.

Due to its thermal capacity, heating element 5 serves as a buffer for the laser energy. This is continuously expanded through the heating element, even if point of impingement 71 of the laser is moved and/or the laser output is varied.

Generally, and without limitation to the illustrated example it can be advantageous, to not exclusively heat with a laser so that a high heat output can easily be provided. The laser beam then serves as additional heater to create a desired temperature profile on the heating element, or to compensate for local or chronological inhomogeneities in the temperature progression. According to one embodiment of the present invention it is thus provided, that heating element 5 is additionally heated electrically or with a burner.

According to another embodiment of the present invention, material 2 can be provided in the embodiment of a preform 6 from which then material ribbon 1 is drawn, wherein by way of a drawing device 12 tension is applied to ribbon 1, while preform 6 is heated and softened by heating element 5 and possibly by means of additional heating elements. The method is especially suited to produce a glass ribbon from a glass preform. Temperature variations in cross direction to the direction of draw however manifest themselves directly in an inhomogeneous thickness of the ribbon. With local heating with laser beam 70, focused local heating of the heating element can now be performed according to the present invention, in order to counter such temperature variations. It is conceivable to focus laser beam 70 firmly onto a certain point provided the respective position on material ribbon 1 is cooler than adjacent regions. A flexibly adjustable compensation is generally possible in that laser beam 70 is moved in the direction transversely to the longitudinal direction of material ribbon 1, so that the energy of the laser beam distributes itself on heating element 5 in the direction transversely to the longitudinal direction of material ribbon 1. As shown in the example in FIG. 1 a beam deflection device 9 can be provided, to move the point of impingement of laser beam 70 on heating element 5 in the direction transversely to the longitudinal direction of material ribbon 1, so that the energy of the laser beam distributes itself on the heating element in the direction transversely to the longitudinal direction of material ribbon 1.

The distribution of the laser output on the heating element can be controlled. According to another embodiment of the present invention, a control unit 15 is provided for this, which is arranged to change the position of the point of impingement 71 of laser beam 70 of laser 7 in order to influence the temperature distribution on heating element 5.

Such a control unit 15 can generally also control additional parameters. In particular, control of the laser output can be mentioned. In the example in FIG. 1, control unit 15 is connected accordingly with beam deflection device 9 and with laser 7. According to one embodiment of the invention and without limitation to the illustrated example it can be advantageous to provide at least one sensor that captures measured values and that is connected with the control unit, wherein control unit 15 is arranged to control at least one of the parameters: position, duration of radiation and radiation output of laser beam 70 by means of the captured measured values. As shown in the example in FIG. 1, sensor 8 can capture measured values of material ribbon 1. These can include the local temperature of material ribbon 1, but also its thickness or position. One example where the position of the material ribbon is influenced by laser beam 70 is explained further below.

A galvanometer-scanner or a polygon mirror can be used as beam deflection device 9. According to an additional embodiment the laser light is transmitted by fiber optics or respectively a light conductor. Here it is possible to move the output end of the light conductor and thereby also the emitting laser beam in order to be able to adjust the point of impingement.

Figure 2:
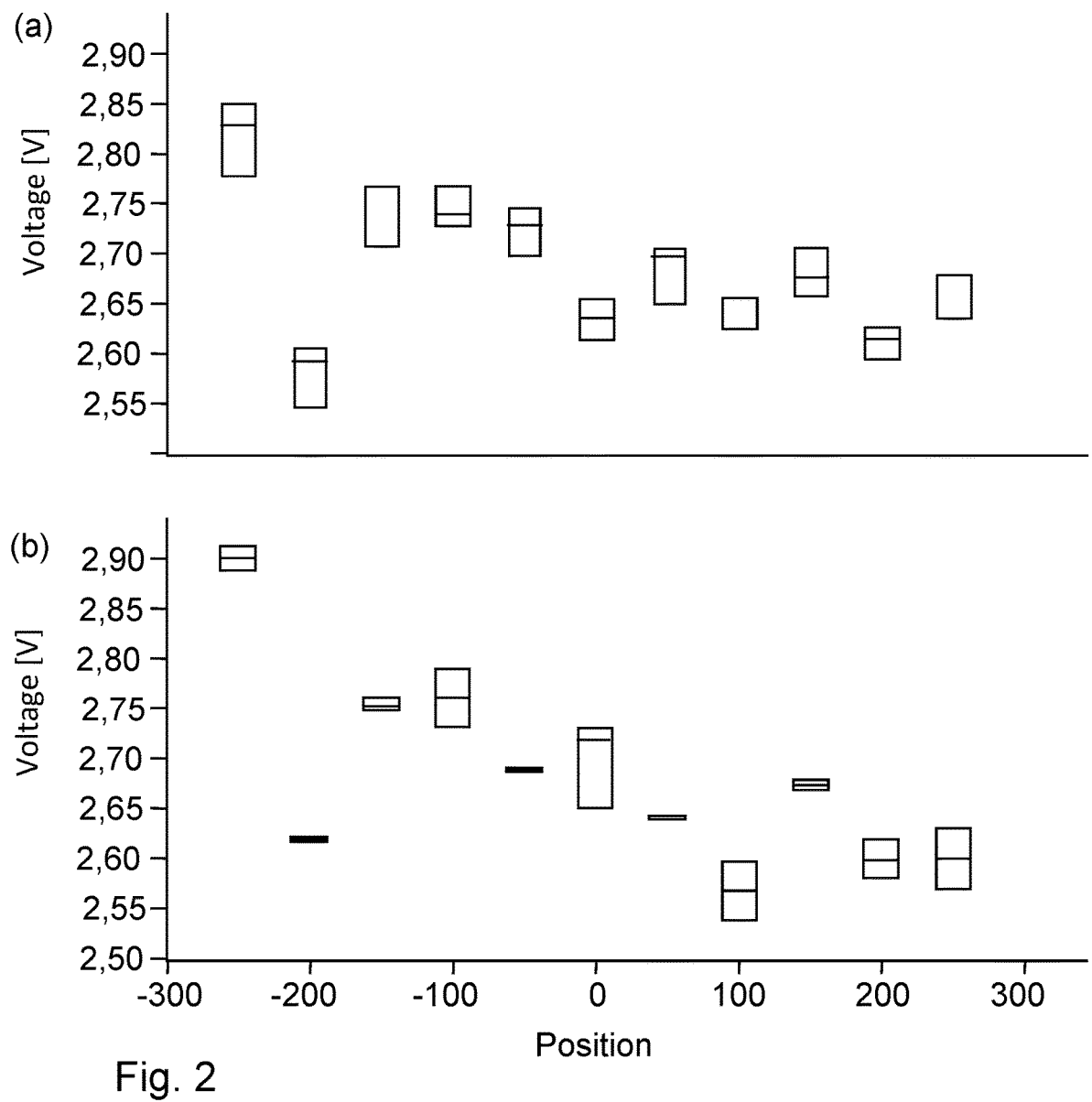
FIG. 2 illustrates diagrams of voltage drop along two electrically driven heating elements.

FIG. 2 shows two diagrams of the measured voltage drop on electrically heated silicon carbide heating tubes. The bars around the measured values that are illustrated as lines represent the respective error bars. Generally, the voltage drops from left to right, however the voltage values fluctuate measurably. The heat outputs and temperatures also vary accordingly. These measured values can now be used for example to determine a movement profile of the point of impingement 71 of laser beam 70, which counters the inhomogeneous temperature distribution.

Generally, and without limitation to the example featured in FIG. 2 it is provided according to the present invention that the temperature distribution is defined along heating element 5 and the point of impingement 71 of laser beam 70 is moved subject to this temperature distribution. The temperature distribution can herein be determined directly in the form of temperature measured values or indirectly by means of parameters which are influenced by the temperature or which influence the temperature. In the example in FIG. 2 this parameter is the voltage drop along the heating tube. Below, and in reference to these two diagrams an additional example is described for the manufacture of a glass ribbon with the method according to the invention.

Figure 3:
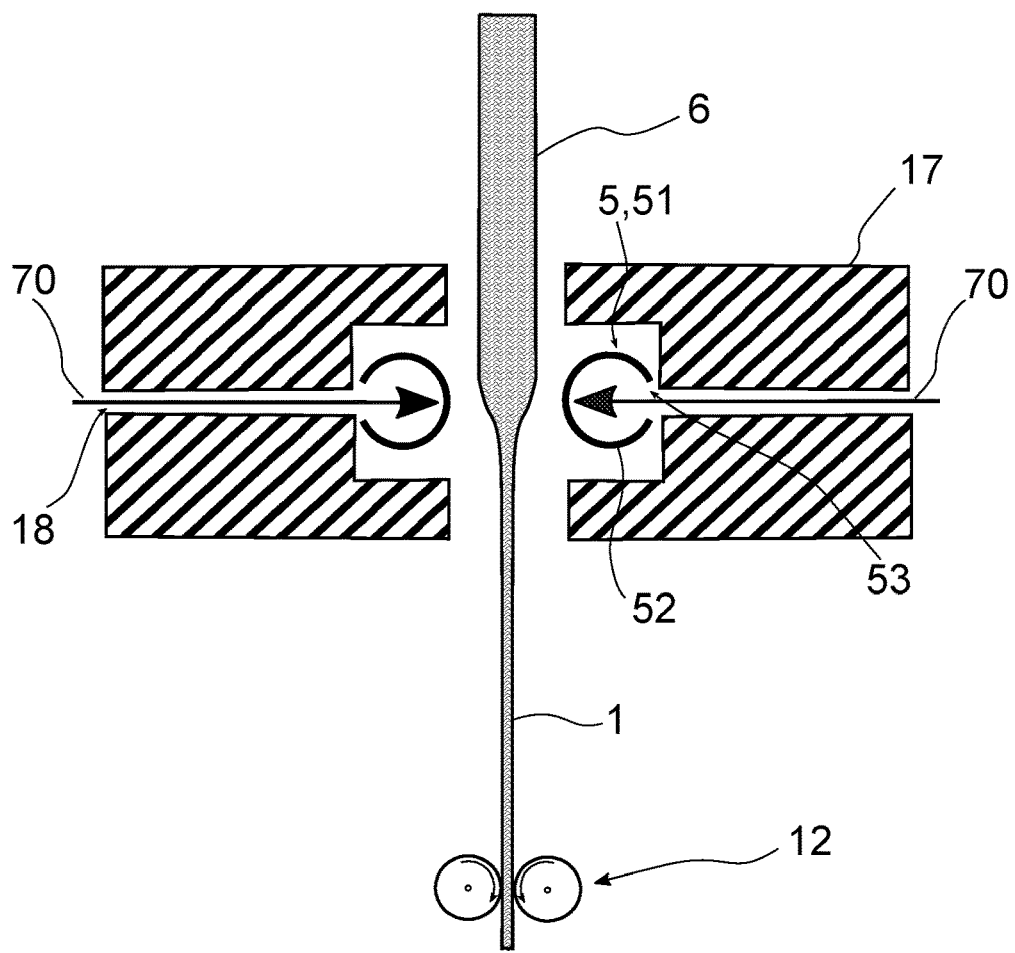
FIG. 3 illustrates a device for the manufacture of a material ribbon.

In a schematic view of the device, FIG. 3 illustrates additional embodiments of the invention in direction onto the edge of a material ribbon 1. Just as in the example shown in FIG. 1, material ribbon 1 is herein drawn from a preform 6, whereby the draw is implemented by a draw device 12. As illustrated, draw device 12 can include for example driven rolls. According to one embodiment of the invention, heating element 5 includes an electrically heated heating tube 51. In particular, and as illustrated two heating tubes 51 which are located at a distance from one another and between which material 2 or respectively material ribbon 1 that is to be processed is guided, can also be provided. Heating tube 51 is generally arranged transversely to the longitudinal direction of material ribbon 1 or respectively, the longitudinal direction of the heating tube progresses in cross direction relative to the longitudinal direction of the material ribbon in order to heat the material ribbon across its width. On the other hand, inhomogeneities in the temperature distribution in the material ribbon can also occur across the width of material ribbon 1. Such irregularities are countered by additional local heating of heating tube 51 by means of laser beam 70. However, in the case of a tube there is the problem that its side facing material ribbon 1 is also covered by the material ribbon. To have laser beam 70 nevertheless radiate onto this region of the heating tube it is provided in a further advancement of the invention that the side of lateral surface 52 of heating tube 51 that is facing away from material ribbon 1 has an opening 53. In this way, laser beam 70 can penetrate through opening 53 and heating tube 51 and can impinge on the inside of the side of lateral surface 52 that is facing material ribbon 1. If laser beam 70 is intended to not only selectively radiate a certain location of lateral surface 52 it may be advantageous to design opening 53 as a slot extending in longitudinal direction of heating tube 51. In this way, the laser beam can be guided along the slot so that the point of impingement of laser beam 70 can be positioned selectively in longitudinal direction of heating tube 51.

As shown in the example in FIG. 3, heating element 5 can continue to be surrounded by a thermal insulation 17. Thermal insulation 17 may have an opening 18 to allow laser beam 70 to radiate onto heating element 5 through this opening 18.

Figure 4:
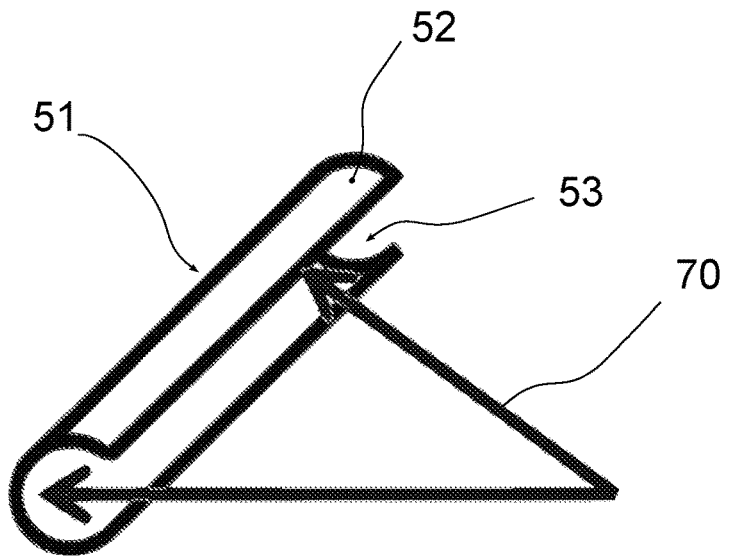
FIG. 4 illustrates an embodiment of a heating element.

For clarification FIG. 4 illustrates again such a heating element in the embodiment of a heating tube 51 with a slotted opening 53 in lateral surface 52 of the tube, and laser beam 70 which penetrates through the slotted opening and impinges on the inside. As illustrated, laser beam 70 can be moved along the slot in order to vary the point of impingement.

Figure 5:
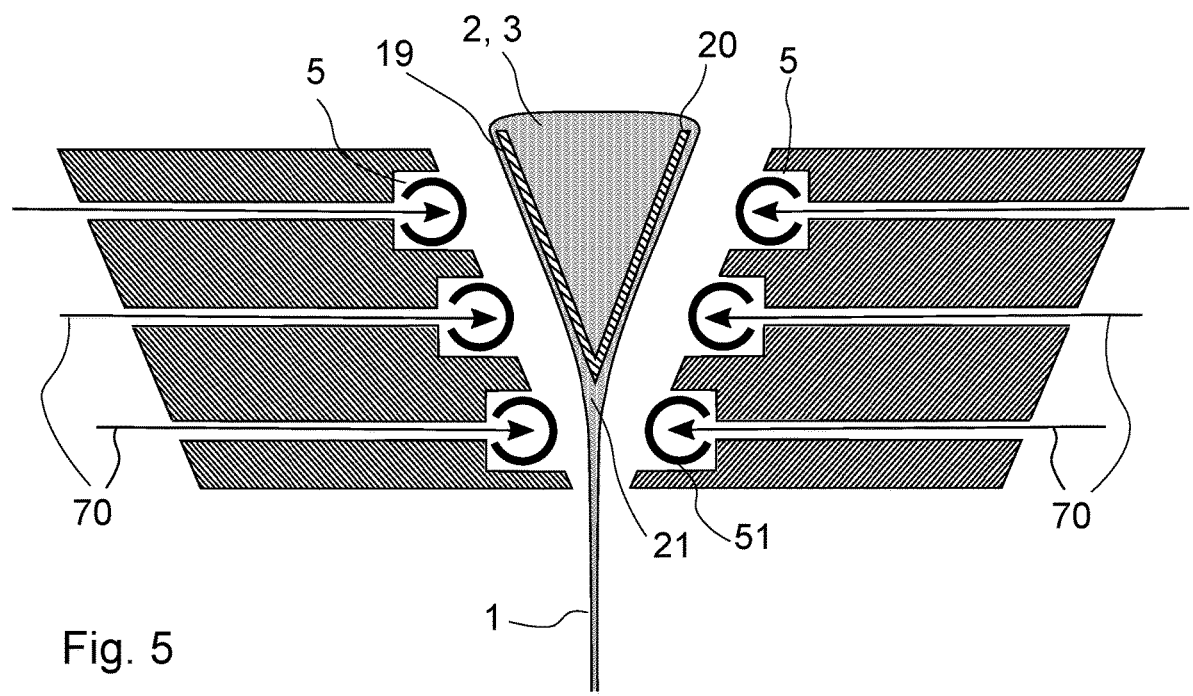
FIG. 5 illustrates an embodiment with several heating elements.

FIG. 5 illustrates one design example wherein material ribbon 1 is produced in the overflow-fusion process. In this process, a container 19 which is open on top is filled continuously with molten material 2, for example a glass melt 3, so that material 2 finally overflows over edge 20 of container 19 and flows down its sides. The material flow then merges on the bottom of container 19 typically in a draw cone 21 from which material ribbon 1 is drawn from the container by means of a draw device that is not illustrated here. In order to avoid premature cooling of the molten material 2 when it runs down the sides of container 19, several heating elements 5 are arranged on top of one another on both sides, in this case again in the embodiment of heating tubes 51. At least one, preferably as illustrated several heating elements 5 on each side are heated respectively locally by means of a laser beam 70 in order to keep the temperature distribution of molten material 2 as uniform as possible.

Figure 6:
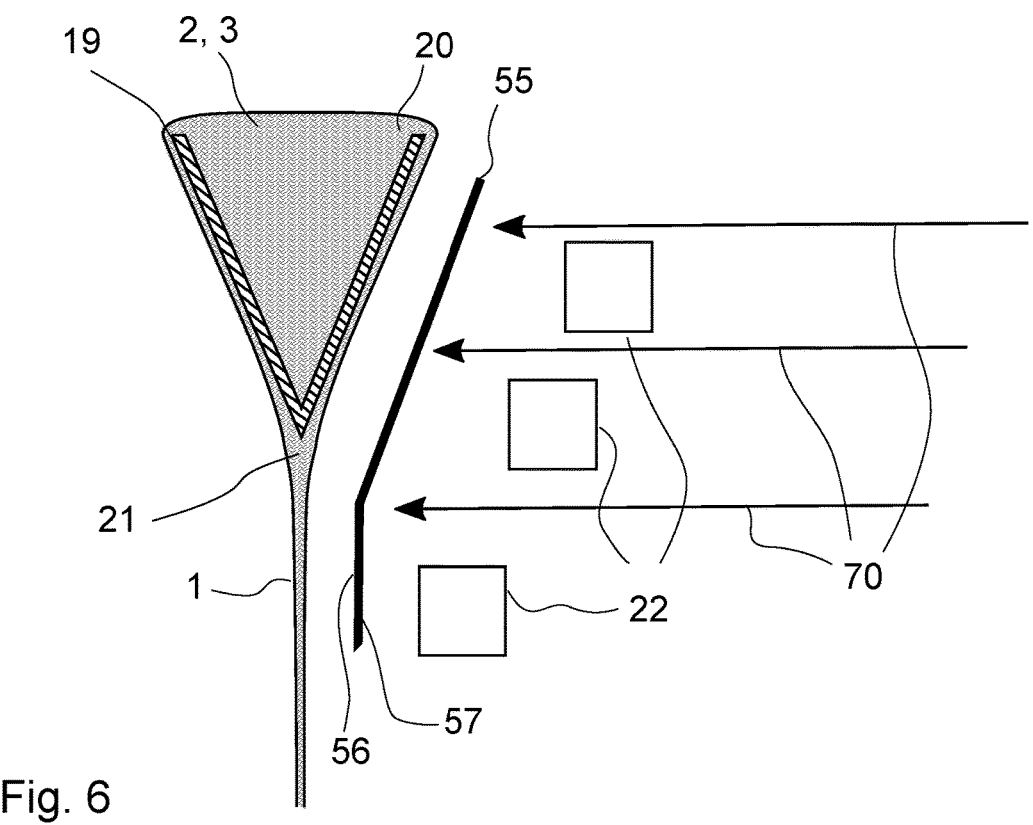
FIG. 6 illustrates one embodiment of the present invention with a plate-shaped heating element.

FIG. 6 shows an example of an additional embodiment of the invention. This embodiment is based generally on the fact that heating element 5 includes a plate 55 whose one side 56 faces material 2 of material ribbon 1 and whose opposite side 57 can be heated by laser beam 70. Thus, generally in this case too, a surface of heating element 5 facing away from material ribbon 1 is radiated by laser beam 70. This is generally advantageous since impurities can possibly evaporate from the radiated surface during an intensive short-duration heating of the radiated point and can condense on the material ribbon. Plate 55 can be oriented parallel to the material ribbon. With one or several laser beams 70 a flat or respectively a two-dimensional temperature distribution can herein be affected. Thus, not only the temperature of plate 55 can be increased locally, but when increasing an area that extends in direction of travel of the material, the exposure time of the temperature increase can generally be adjusted.

Heating element 5 in the embodiment of a plate 55 is heated by heating devices 22 which provide the main heat output. These heating devices 22 may for example be combustion heaters or electrical heaters. As in the example in FIG. 5, material ribbon 1 in the example in FIG. 6 is also produced in the overflow-fusion process, whereby obviously also in this case another process, such as drawing from a preform may be utilized. For the sake of simplicity only one plate 55 is illustrated in FIG. 6. Generally, however, two plates located opposite one another are used, between which material 2 of material ribbon 1 is guided. Positioning of heating devices 22 is also advantageously adjustable in order to adjust the spatial emission of the heat output. The combination of heating by means of conventional heating devices, combined with heating by a laser can be especially advantageous, since the laser alone is possibly not able to provide the desired heat output.

Figure 7:
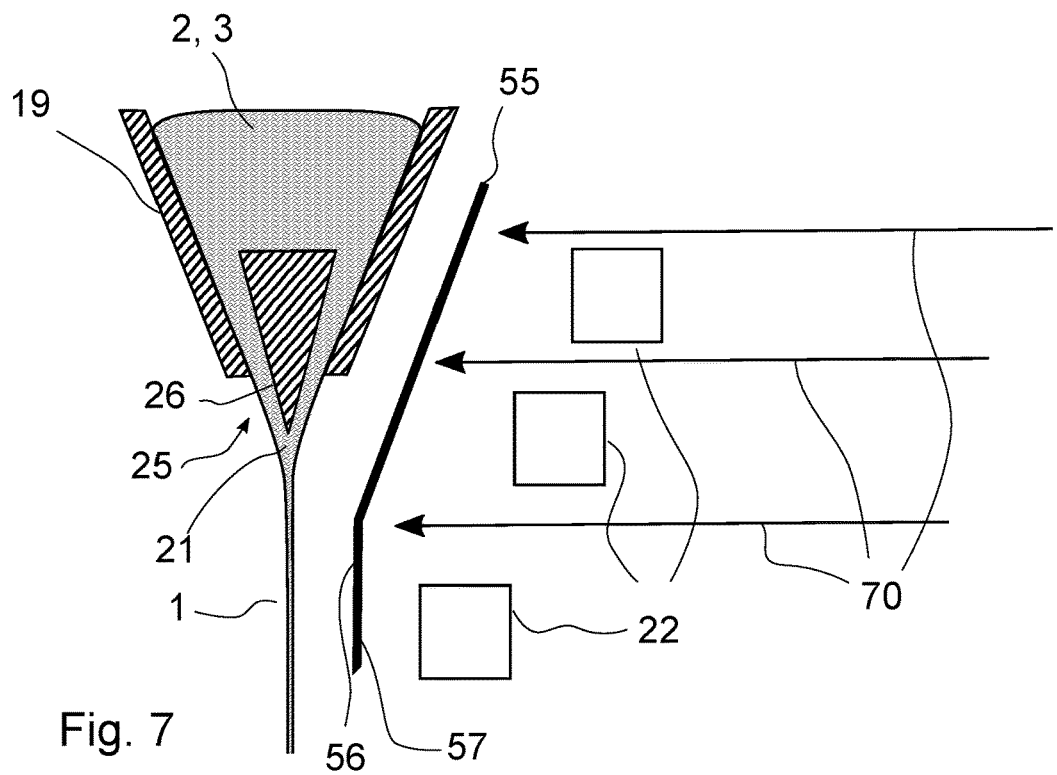
FIG. 7 illustrates another embodiment of the present invention which is a variation of the embodiment in FIG. 6.

According to an additional embodiment of the invention, material ribbon 1 is produced in the down-draw process. One example for this is shown in FIG. 7. In this process, molten material 2, for example a glass melt 3 emerges from a downward directed nozzle 26 and is also drawn into a material ribbon by means of a draw-device that is not illustrated in this drawing. As illustrated, nozzle 25 can include a central nozzle body 26 which protrudes from the nozzle opening and which is surrounded by the molten material.

As in the example in FIG. 6, a plate 55 is provided as the heating element which faces material ribbon 1 with one side 56 and which heats nozzle 25 and emerging material 2. As in the example in FIG. 6, plate 55 is heated by heating devices 22 as well as by one or several pivotable laser beams 70 facing away from nozzle 26 and material ribbon 1. Again, only one of the plates 55 that are located opposite material ribbon 1 is illustrated.

Below, examples of the invention and comparative examples for the production of glass ribbons are described.

Comparative Example 1

An optical glass preform with a refractive index of >1.7, a thickness of 14 mm and a width of 380 mm is drawn in a re-draw unit into a glass ribbon having a thickness of 300 µm.

The re-draw unit includes a preform drive, a vertical oven and a drawing unit with a draw device 12. The oven includes a preheating zone, a hot-forming zone and a cooling zone. The preheating zone and the cooling zone are equipped with segmented coil heaters. The hot-forming zone is heated by means of two silicon carbide heating tubes 51 that are arranged horizontally opposite one another and through which electricity flows. Heating tubes 51 have a heatable length of 500 mm and a diameter of 25 mm.

To achieve an as homogeneous temperature distribution as possible, several heating tubes are measured in regard to their heat output distribution. For this purpose, the tube that is to be measured is supplied with electric current and the drop in resistance is measured with the assistance of contact pins every 5 cm along the length of the tube over a measured distance of 3 cm. Based on the measurements, two tubes are selected and arranged such that the mean value of the output density is constant over the entire width of the oven. Particular attention is paid that the heat output distributions occur symmetrically to the vertical center axis of the heating zone. The voltage drops along both of these heating tubes are the measured values shown in the two diagrams (a) and (b) of FIG. 2.

The thickness across the glass ribbon, as well as the position of the glass ribbon edges is determined through confocal chromatic thickness measurement with an optical sensor that is moved transversely to the glass ribbon. The obtained thicknesses and positioning signals are captured and applied electronically.

The thus obtained glass ribbon 1 has a net region in which the thickness has a deviation from the target thickness of less than +/−15 μm. To this net region with a width of 180 mm, thicker edges attach themselves in the edge area of ribbon 1. The deviations from the target thickness in the net region can be reduced by additional cooling nozzles below the SIC tubes. This however leads to stronger warping of the glass ribbon, since the adjustments of the blowing nozzles influence also cooling and thereby the tensions in the glass ribbon. In addition, a residual deviation from the target thickness of approx. +/−10 μm remains.

The remaining asymmetry of the heating tubes possibly results in that the glass ribbon does not travel centered through the annealing oven. This leads to unbalanced cooling and thus to warping of the glass ribbon.

Example 1

In the re-draw unit in comparative example 1, a heating tube is slotted over a width of 420 mm and a height of 20 mm on the side facing away from the oven's interior space. The insulation of the oven is modified in such a way that the laser beam can be directed onto the inside of the SIC heating tube, so that an arrangement according to the schematic depiction in FIG. 3 is provided. A laser beam of a CO2 laser with 3 kW rated output is used. Laser beam 70 is guided by optics with a speed of 20 m/s, oscillating over the inside of the tube. The control unit provides therein for targeted control of the laser beam output for each location of the beam on the heating tube. At the heating tube the beam has a diameter of <20 mm.

Adjustment of the Ribbon Location

Figure 8:
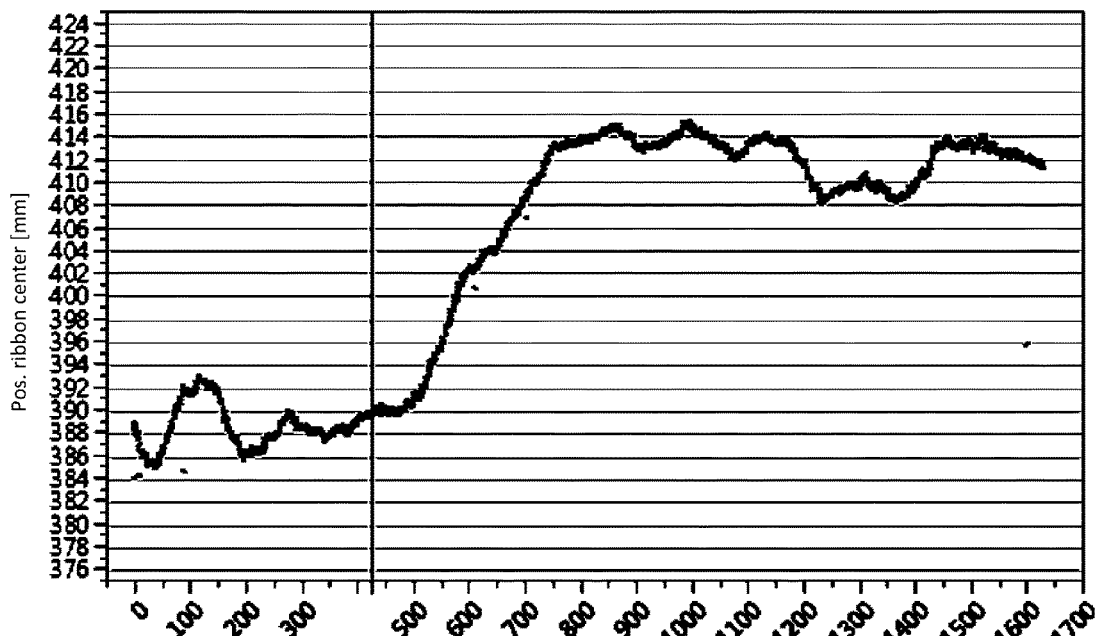
FIG. 8 illustrates measured values of the position of the ribbon center of a material ribbon.

To guide the ribbon centered through the cooling section, unbalanced energy is suppled in the edge region of the heater. A redistribution of 30 W heat output over a distance of 60 mm causes a correction in the position of the glass ribbon of 30 mm. The result is illustrated in the diagram in FIG. 8. The diagram shows the position of the ribbon center as a function of the longitudinal position of the ribbon. At the marking in the form of a vertical line—approximately at longitudinal position 424—the laser output was switched over. It is clearly visible how as a result, the position of the ribbon center adjusts at higher values at around 410 mm.

Adjustment of Net Width

To increase the net width of the glass ribbon, targeted laser output is applied into the side of the edges. An addition of heat output of 22 W over a distance of 30 causes an increase in the net width of the glass ribbon of 20%.

Adjustment of Thickness Deviation

Thickness deviations occurring in the net region are corrected by targeted addition/removal of laser output. An addition of heat output of 22 W over a distance of 20 mm causes a decrease of thickness in the glass ribbon in this region of 3%. The thickness deviation in the glass ribbon can hereby be adjusted to below +/−0.5 μm without negatively influencing the warp.

Figure 9:
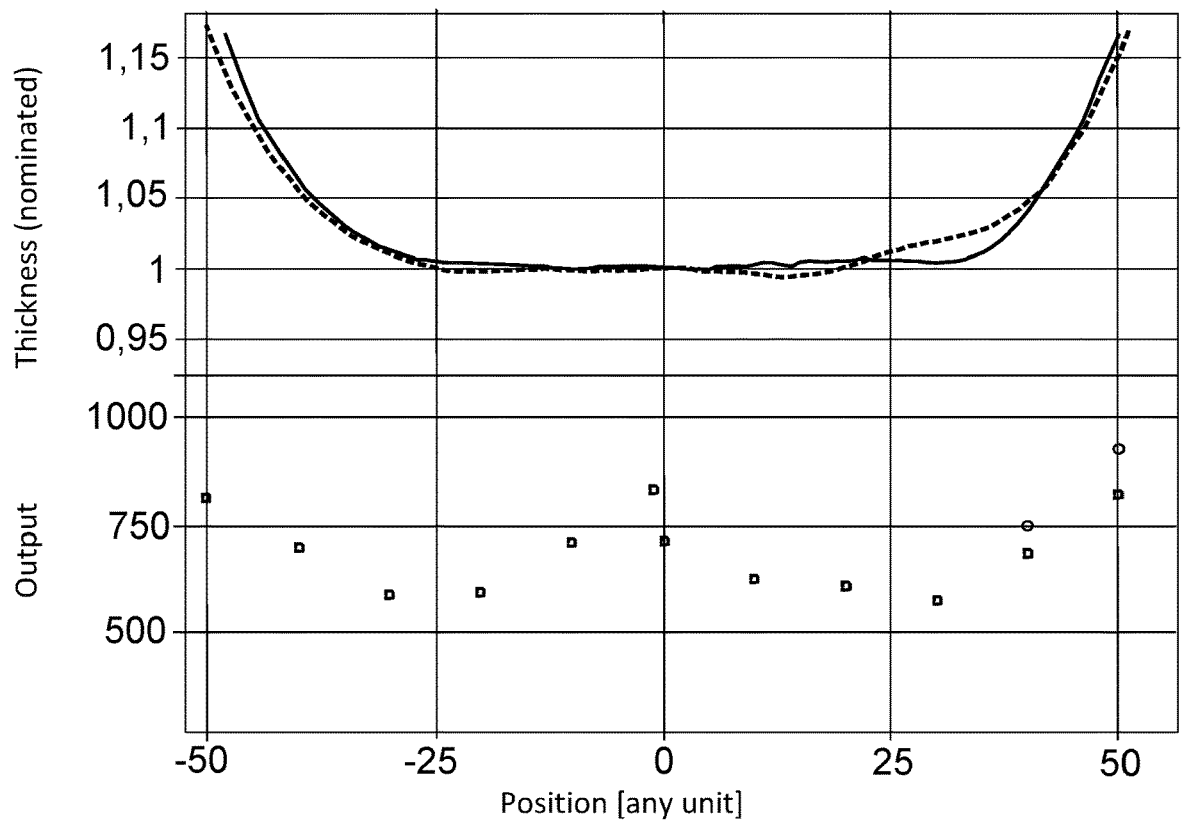
FIG. 9 illustrates measured values of the thickness of a glass ribbon before and after an adjustment of the heating output, as well as the heating output as a function of the lateral coordinate of the ribbon.

Supplementary hereto, the measurement of the thickness of the glass ribbon before and after the correction is shown in FIG. 9. The dotted line represents the measured values of the ribbon thickness in transverse direction before the correction; the solid line represents the measured values after the correction.

In the lower half of FIG. 9, the measured values of the heat output along transverse direction are shown. At the far right in the diagram, above position value of 25, two additional output values are entered in the form of circles. These are the values after connecting the laser which lead to the altered ribbon thickness. As can be seen, the ribbon thickness fluctuates less, especially at the edge. In addition, the net width of the ribbon—that is in the region of consistent thickness—can be somewhat widened between the edges.

Comparative Example 2

For the manufacture of an aluminosilicate glass ribbon with a thickness of 700 μm for the production of glass sheets suitable for displays, the glass that was melted in a glass melting tank is directed via a container 19 in the embodiment of an overflow channel (Isopipe) and the two overflowing glass strands are again merged below the channel in a draw cone 21. Consequently, the glass ribbon is produced in the overflow-fusion process according to the example in FIG. 5. Special significance is hereby attached to the temperature distribution of the glass layer on the Isopipe and in the draw-cone. A homogeneous temperature distribution is achieved through segmented and mechanically adjustable heaters and coolers, as well as radiant plates. Due to the required spatial expansion of the heaters, their effect on areas in the size range of several centimeters can also be observed.

Example 2

The insulation is modified, and the heater arrangement is replaced by heater elements according to the arrangement in FIG. 5 which, depending on the location are supplied with adjustable laser output by a scanning laser beam 70 facing away from the oven's interior space. With this, the transverse temperature distribution can be precisely adjusted along the glass stream during hot-forming. Based on the thermal inertia of heating elements 51 it is generally sufficient to work with one laser 7.

Comparison Example 3

To produce a glass ribbon with a thickness of 700 μm—again of aluminosilicate glass—, for example for displays, the glass that was melted in a glass melting tank is guided with a blade through a slotted nozzle or respectively a central nozzle body 26 as shown in the example in FIG. 7, and two glass strands flowing from the nozzle body are again merged in a draw cone 21. Special significance is herein attached to the temperature distribution of the glass layer on nozzle body 26 and in draw cone 21. A homogeneous temperature distribution is achieved through segmented and mechanically adjustable heating devices 22, as well as through heating devices 5 in the embodiment of plates 55. Due to the necessary spatial expansion of heating devices 22, its effect upon areas within the size range of several centimeters can also be observed.

Example 3

The insulation and the heater arrangement are modified, so that the radiant plates on the side facing away from the interior oven space are additionally provided depending on location and with adjustable laser output by means of scanning laser beam 70 as illustrated in FIG. 7. This enables targeted adjustment of the transverse temperature distributions along the glass stream in the hot-forming zone. Due to the thermal inertia of the heaters, it is sufficient to work with a laser.

Figure 10:
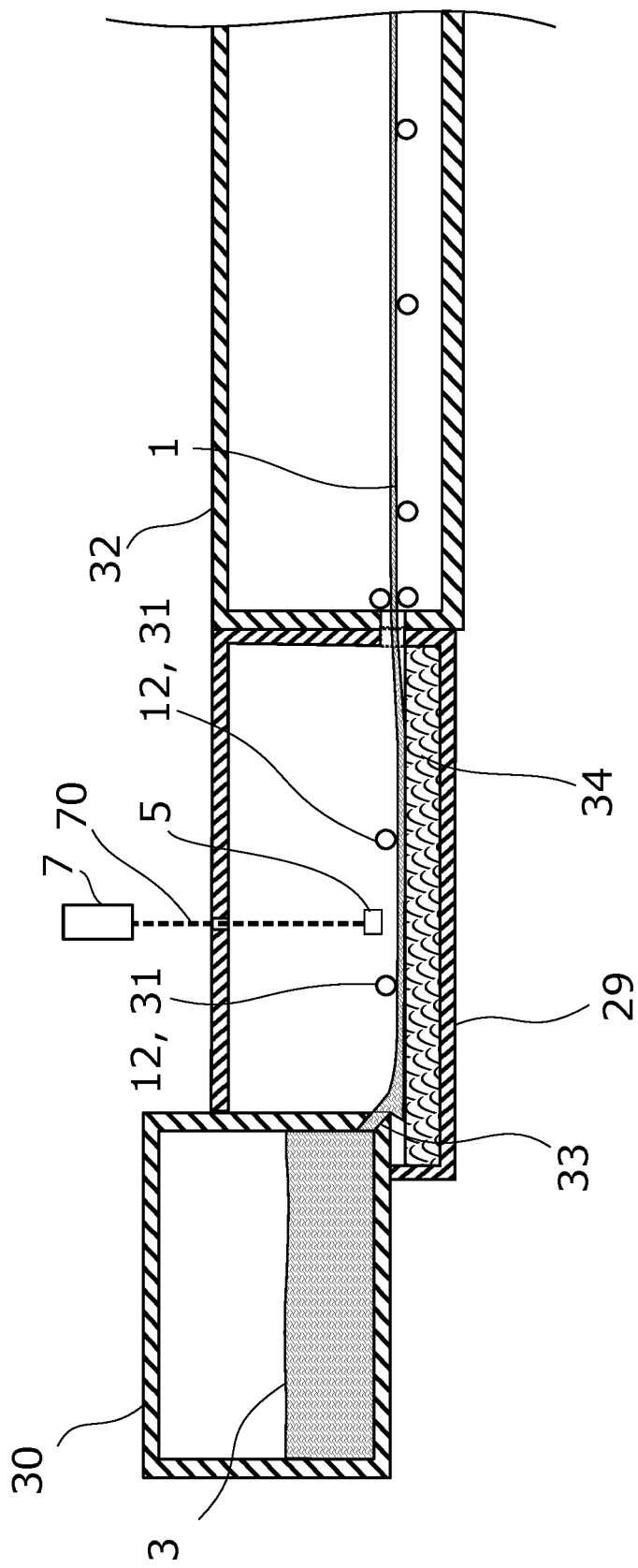
FIG. 10 illustrates a device for the manufacture of glass ribbons with a float tank.

The methods described in the design examples above for the manufacture of glass ribbons are methods wherein the glass ribbons are drawn from the melt—the updraw-process and in particular also the float-process. In this context, FIG. 10 is a schematic illustration of one embodiment of an apparatus 10 with a float tank 29. Float tank 29 is located after a melting tank 30 where a glass melt is produced. Glass melt 3 flows from one outlet 33 onto tin bath 34 in float tank 29. Glass melt 3 distributes itself extensively therein and—supported by draw rolls 31 which are a component of draw device 12—forms a material ribbon. While the glass is moved over the tin bath, it slowly cools and solidifies, so that it can be lifted off at the end of float tank 29. The glass ribbon then travels through an annealing oven 32. Here, heating element 5 is arranged above the material ribbon in the superstructure of float tank 29. Laser beam 70 may for example be introduced through a slot in the superstructure of float tank 29. Here too, the viscosity of the glass can be locally finely adjusted through the heat output of the laser, in order to compensate for thickness fluctuations. Generally, and without restriction to the design example it is also provided that the forming process of the material ribbon includes manufacture of a material ribbon in the float process.

Figure 11:
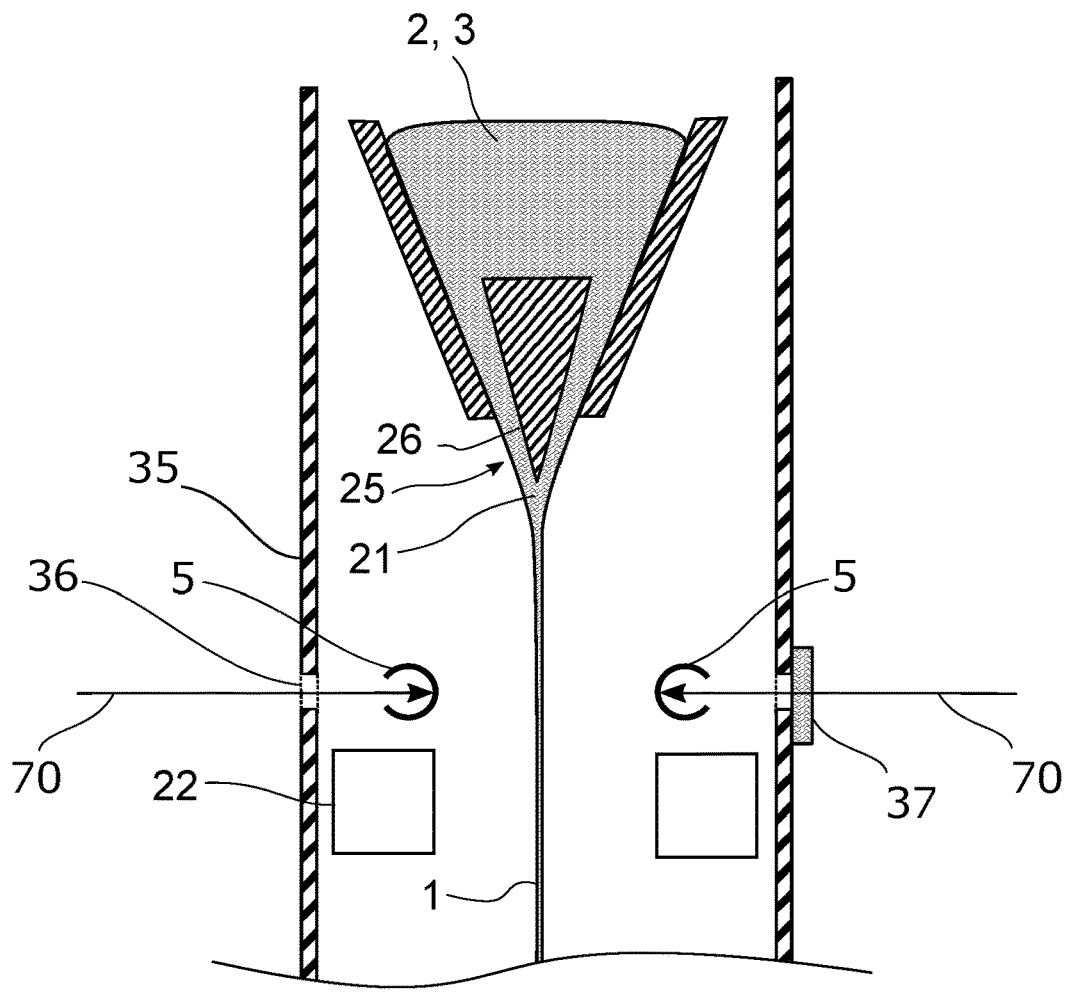
FIG. 11 is an embodiment of a device used in the down-draw process in the manufacture of a glass ribbon.

FIG. 11 illustrates details of an additional embodiment of the invention. As also shown in the example illustrated in FIG. 7, in this example the down-draw process is also used to produce a glass ribbon. Nozzle 25 is arranged in a draw shaft 35. Draw shaft 35 is made preferably from metal sheets, for example high-grade steel. The draw shaft prevents lateral air flows and thus supports controlled cooling. Laser beam 70 is introduced through an opening 36 in the draw shaft and then impinges onto heating element 5 that is located in the interior of draw shaft 35. Opening 36 is preferably slotted to allow lateral movement of the laser beam over heating element 5 in transverse direction of material ribbon 1. To influence the air flows in the interior of the draw shaft as little as possible, opening 36 is as small as possible. According to one embodiment of the invention, the dimensions of opening 36—without limitation to the particular illustrated example, and also without limitation to the special draw method—at least in draw direction are at most three times the size of the diameter of the laser beam. According to an alternative or additional embodiment, the dimension of the window in draw direction is 10 mm at most, for example 7 mm at most, for example between 3 mm and 7 mm.

If transparent materials exist for the wavelength of the laser beam, according to yet an alternative or additional embodiment of the invention, a window 37 may be provided that closes opening 36 and through which laser beam 70 is radiated into the draw shaft. One example can be a window 37 consisting of quartz glass. According to another alternative or additional further development, opening 36 may be designed other than as illustrated, in order to avoid air flows. For example, a collar can be mounted on draw shaft 35 and surround opening 36.

In general, and without limitation to the draw process—whether from the melt or from a pre-form—and without limitation to the special configuration illustrated in FIG. 7, it is provided according to the preceding description and in a further development of the invention, that the apparatus includes a draw shaft 35 in which the material in its heated and softened condition is drawn into a material ribbon 1, wherein heating element 5 is located in the interior of draw shaft 35 and wherein laser beam 70 is radiated through an opening in the draw shaft onto heating element 5. Hereby, at least one of the following properties are realized:

the draw shaft is closed by a window that is transparent for laser beam 70,
  the opening is shaft-like, wherein a collar surrounds opening 36,
  the dimensions of opening 36 in draw direction are at most three times the size of the diameter of the laser beam.

Many different materials can be used for heating element 5. One criterion may be connection to the laser beam. In this context, the material of the surface being radiated by the laser beam should have an as low as possible reflectivity for the wavelength of laser beam 70. In general, ceramic materials are ideally suited for this. According to one embodiment of the invention it is also provided, that heating element 5 includes a ceramic material. This also covers an already mentioned SIC heating element. Silicon carbide has very high thermal conductivity. On the one hand, this is good in order to quickly direct the laser output that is typically incoming with low inertia to the side of heating element 5 which faces the material ribbon. On the other hand, this could also lead to heat dissipation in the heating element, in direction transverse to the material ribbon. In order to obtain heat distribution transversely to the material ribbon that is as defined as possible, it is provided in further development of the invention that the heating element has thermal conductivity in the direction transversely to the longitudinal direction of material ribbon 1 (determined by the draw direction in the forming process) that is lower than the heat conduction or thermal conductivity in the direction from the side facing away from material ribbon 1 toward the side facing the material ribbon—in other words in the direction towards the material ribbon.

Figure 12:
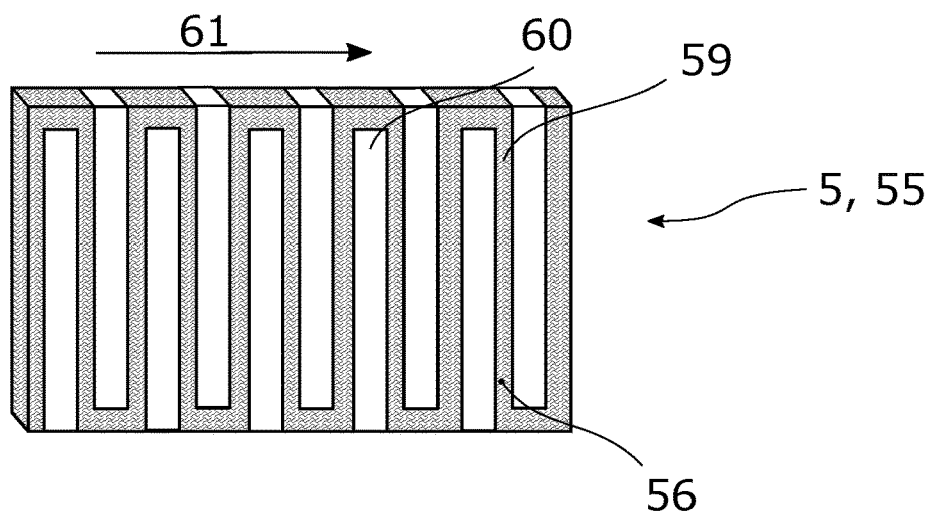
FIG. 12 is one embodiment of a heating element.

In this context, FIG. 12 shows an example as to how such an anisotropic thermal conductivity can be achieved. In this example, heating element 5 is a plate 55 in the embodiment of a composite element. The sequence of the segments of different materials with different coefficients of thermal conductivity are selected such, that the heat flow in transverse direction 61 of the material ribbon is less than perpendicular thereto—in other words in longitudinal direction of the material ribbon and also in the direction onto the ribbon. Transverse direction 61 is shown for clarification purposes. The reduction in the heat flow in transverse direction 61 is achieved, for example through a sequence of metallic segments 59 and ceramic segments 60. Metallic segments 59 can also be connected in a meandering pattern, so that they can be activated electrically in order to heat heating element 5. The laser radiation serves then as auxiliary heat in order to achieve a certain heat output profile in transverse direction 61.

To reduce an undesirable heat flow, the heating element may in general include a material whose thermal conductivity is less than 50 W/m·K. In the illustrated example this can relate to the metallic as well as to the ceramic segments 59, 60. The heat flow in transverse direction 61 can be reduced with the compound material, even if another material of the compound has high thermal conductivity.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING 1 material ribbon
2 material
3 glass melt
5 heating element
6 preform
7 laser
8 sensor
9 beam deflection device
10 device for producing a material ribbon
12 draw device
15 control unit
17 heat insulation
18 opening in 17
19 container
20 edge of 19
21 draw cone
22 heating device
25 nozzle
26 nozzle body
29 float tank
30 melting tank
31 draw roll
32 annealing oven
33 outlet
34 tin bath
35 draw shaft
36 opening in 36
37 window
50 surface of 5
51 heating tube
52 lateral surface of 51
53 opening in 52
55 plate
56, 57 sides of 55
59 metallic segment
60 ceramic segment
61 transverse direction
70 laser beam
71 point of impingement of 70 onto heating element 5

What is claimed is:

1. A method for the manufacture of a material ribbon, comprising the steps of:
    drawing a material in a heated and softened state into the material ribbon in a forming process of the material ribbon, and cooling down the material ribbon;
    heating the material during the forming process by supplying to the material a thermal energy which is at least partially in the form of a thermal radiation from a heating element such that a temperature distribution is defined along the heating element, the heating element has a surface for emitting the thermal radiation that is located opposite the material;
    heating the heating element at least partially through an energy of a laser beam that is directed onto the heating element for locally heating the heating element; and
    moving a point of impingement of the laser beam subject to the temperature distribution.

2. The method of claim 1, wherein the heating element is additionally at least one of heated electrically and with a burner.

3. The method of claim 1, wherein the material ribbon is a glass ribbon that is drawn from a glass melt or a preform.

4. The method of claim 1, wherein the heating element has a surface facing away from the material ribbon, and the method includes a step of radiating, by the laser beam, the surface facing away from the material ribbon.

5. The method of claim 1, wherein the material ribbon is produced in one of a down-draw process, an overflow-fusion process, in an updraw-process, and in a float-process.

6. The method of claim 1, wherein the material ribbon is drawn from a heated preform.

7. The method of claim 1, further including a step of moving the laser beam in a direction transversely to a longitudinal direction of the material ribbon so that the energy of the laser beam distributes itself on the heating element in the direction transversely to the longitudinal direction of material ribbon.

8. A method for the manufacture of a material ribbon, comprising the steps of:
    drawing a material in a heated and softened state into the material ribbon in a forming process of the material ribbon, and cooling down the material ribbon;
    heating the material during the forming process by supplying to the material a thermal energy which is at least partially in the form of a thermal radiation from a heated heating element, the heating element has a surface for emitting the thermal radiation that is located opposite the material; and
    heating the heating element at least partially through an energy of a laser beam that is directed onto the heating element for locally heating the heating element,
    wherein a distance of the surface of the heating element facing the material ribbon is smaller in a direction transversely to a longitudinal direction of the material ribbon than its dimension perpendicular to the longitudinal direction of the material ribbon.

9. An apparatus for manufacturing a material ribbon, comprising:
    a draw device configured for drawing a material in a heated and softened state into the material ribbon;
    a heating element having a first surface and being configured for heating the material, during a forming process in which the material ribbon is formed and drawn, by a thermal radiation that is emitted from the first surface of the heating element that is configured to be located opposite the material being heated such that a temperature distribution is defined along the heating element;

a laser having a laser beam that is directed onto the heating element for locally heating the heating element; and a beam deflection device being configured to move a point of impingement of the laser beam of the laser subject to the temperature distribution over the heating element.

10. The apparatus of claim 9, wherein the beam deflection device is configured to move the point of impingement of the laser beam on the heating element in a direction transversely to a longitudinal direction of the material ribbon, so that an energy of the laser beam distributes itself on the heating element in the direction transversely to the longitudinal direction of the material ribbon.

11. The apparatus of claim 9, wherein the heating element comprises an electrically heated heating tube.

12. The apparatus of claim 11, wherein a longitudinal direction of the heating tube proceeds transversely to a longitudinal direction of the material ribbon.

13. The apparatus of claim 12, wherein the heating tube includes a second, lateral surface which is configured for facing away from the material ribbon such that a side of the second, lateral surface of the heating tube has an opening so that the laser beam penetrates through the opening and the heating tube, and impinges on an inside of the side of the second, lateral surface.

14. The apparatus of claim 9, wherein the heating element includes a plate which has one side for facing the material of the material ribbon and an opposite side that is heated by the laser beam.

15. The apparatus of claim 9, further including a control unit connected to the laser and the beam deflection device, the control unit being configured for changing a position of the point of impingement of the laser beam of the laser in order to influence a temperature distribution on the heating element.

16. The apparatus of claim 15, further including at least one sensor that captures measured values and that is connected with the control unit, wherein the control unit controls at least one of a position of the laser beam of the laser, a duration of radiation of the laser beam of the laser, and a radiation output of the laser beam of the laser, dependent upon the captured measured values.

17. The apparatus of claim 9, wherein the heating element has a first side configured to face the material ribbon and a second side configured to face away from the material ribbon, and wherein the heating element has a thermal conductivity in a direction transversely to a longitudinal direction of the material ribbon that is lower than a thermal conductivity in a direction from the second side toward the first side.

18. The apparatus of claim 9, wherein the heating element includes a material whose thermal conductivity is less than 50 W/m·K.

* * * * *

UNITED STATES PATENT AND TRADEMARK OFFICE
CERTIFICATE OF CORRECTION

PATENT NO. : 10,870,599 B2
APPLICATION NO. : 15/986175
DATED : December 22, 2020
INVENTOR(S) : Buellesfeld et al.

It is certified that error appears in the above-identified patent and that said Letters Patent is hereby corrected as shown below:

In the Claims

Column 14
At Line 48 in Claim 8, please delete "heated" immediately before heating element.

Signed and Sealed this
Eleventh Day of October, 2022

*Katherine Kelly Vidal*
Katherine Kelly Vidal
*Director of the United States Patent and Trademark Office*